United States Patent
Yang

(10) Patent No.: US 7,021,335 B2
(45) Date of Patent: Apr. 4, 2006

(54) VALVE FOR MIXING COLD AND HOT WATER

(76) Inventor: Tsai Chen Yang, P.O. Box 63-99, Taichung (TW), 406

(*) Notice: Subject to any disclaimer, the term of this patent is extended or adjusted under 35 U.S.C. 154(b) by 303 days.

(21) Appl. No.: 10/400,110

(22) Filed: Mar. 24, 2003

(65) Prior Publication Data
US 2004/0187938 A1 Sep. 30, 2004

(51) Int. Cl.
*F16K 11/06* (2006.01)

(52) U.S. Cl. .................. 137/625.41; 251/285

(58) Field of Classification Search ............ 137/625.41; 251/285, 286, 288
See application file for complete search history.

(56) References Cited

U.S. PATENT DOCUMENTS

| 4,327,758 | A | * | 5/1982 | Uhlmann | 137/625.17 |
| 4,540,023 | A | * | 9/1985 | Pawelzik | 137/625.17 |
| 5,100,565 | A | * | 3/1992 | Fujiwara et al. | 251/368 |
| 6,123,105 | A | | 9/2000 | Yang | 137/624.51 |

* cited by examiner

*Primary Examiner*—John Fox

(57) ABSTRACT

A valve includes a housing having two inlets and an outlet formed in a bottom panel, a seat secured in the housing and having two ports and an aperture aligned with the inlets and the outlet of the housing. A rotary member is rotatably received in the housing, and engaged onto the seat, and includes a bore communicating with the aperture of the seat, and two slots selectively communicating with the ports of the seat when the rotary member is rotated relative to the housing and the seat. The seat and the rotary member are made of porcelain materials to make a water tight seal without spring members.

6 Claims, 5 Drawing Sheets

VALVE FOR MIXING COLD AND HOT WATER

BACKGROUND OF THE INVENTION

1. Field of the Invention

The present invention relates to a valve, and more particularly to a valve for mixing cold and hot water.

2. Description of the Prior Art

Typical valves for mixing cold and hot water comprise a first inlet coupled to a cold water reservoir and a second inlet coupled to a hot water reservoir for receiving the cold water and the hot water from the cold water reservoir and the hot water reservoir respectively. The valves further include a control mechanism for controlling the flowing and/or the mixing of the cold water and the hot water.

When the first inlet is wrongly coupled to the hot water reservoir and when the second inlet is wrongly coupled to the cold water reservoir, the cold water and the hot water may be wrongly supplied into the valve such that the valve may be operated in different actuation or rotation directions from that of the usual directions of the typical valves.

In order to solve the problem, the applicant has developed a valve including a symmetric mechanism that may be assembled according to the cold water inlet and the hot water inlet of the valve body. The valve has been disclosed in U.S. Pat. No. 6,123,105 to Yang, and comprises two gaskets biased toward and to engage with a plate of a knob by coil spring members.

However, the coil spring members may become fatigue after use, and the gaskets thus may not be solidly and effectively biased toward and to engage with the plate of the knob.

The present invention has arisen to mitigate and/or obviate the afore-described disadvantages of the conventional valves.

SUMMARY OF THE INVENTION

The primary objective of the present invention is to provide a valve having porcelain members for solidly and effectively making water tight seals without coil spring members.

In accordance with one aspect of the invention, there is provided a valve comprising a housing including a bottom panel having a first inlet, a second inlet and an outlet formed therein, and including a chamber formed therein, a seat made of porcelain material, and received in the chamber of the housing, and engaged onto the bottom panel of the housing, the seat including a first port and a second port and an aperture formed therein and aligned with the first and the second inlets and the outlet of the housing respectively, a rotary member made of porcelain material, and rotatably received in the chamber of the housing, and engaged onto the seat, the rotary member including a bore formed therein and aligned with and communicating with the aperture of the seat, and including a first slot and a second slot formed therein, and selectively communicating with the first and the second ports of the seat respectively when the rotary member is rotated relative to the housing and the seat, a cover attached onto the housing, to retain the seat and the rotary member within the chamber of the housing, and means for rotating the rotary member relative to the seat and the housing, to selectively aligning the first slot and the second slot of the rotary member with the first and the second ports of the seat respectively.

The first and the second slots of the rotary member each includes a portion communicating with the bore of the rotary member. The seat includes an upper portion having a space formed therein and communicating with the aperture thereof, the portions of the first and the second slots of the rotary member are communicating with the bore of the rotary member, and thus communicating with the space of the seat.

The housing includes at least one projection extended into the chamber thereof, the seat includes at least one opening formed therein to receive the at least one projection of the housing, and to position the seat relative to the housing, and to prevent the seat from being rotated relative to the housing.

The bottom panel of the housing includes an upper portion having a depression formed therein, a sealing ring received in the depression of the bottom panel of the housing, and engaged with the seat, to make a watertight seal with the seat.

The rotary member includes at least one recess formed therein, the valve further includes a follower rotatably received in the chamber of the housing and having at least one jut extended therefrom and engaged into the at least one recess of the rotary member, for allowing the rotary member to be rotated relative to the housing and the seat by the follower.

The follower includes a cavity formed therein, the valve further includes a stem having a swelling provided thereon and engaged into the cavity of the follower, to rotate the follower and thus the rotary member relative to the housing and the seat.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
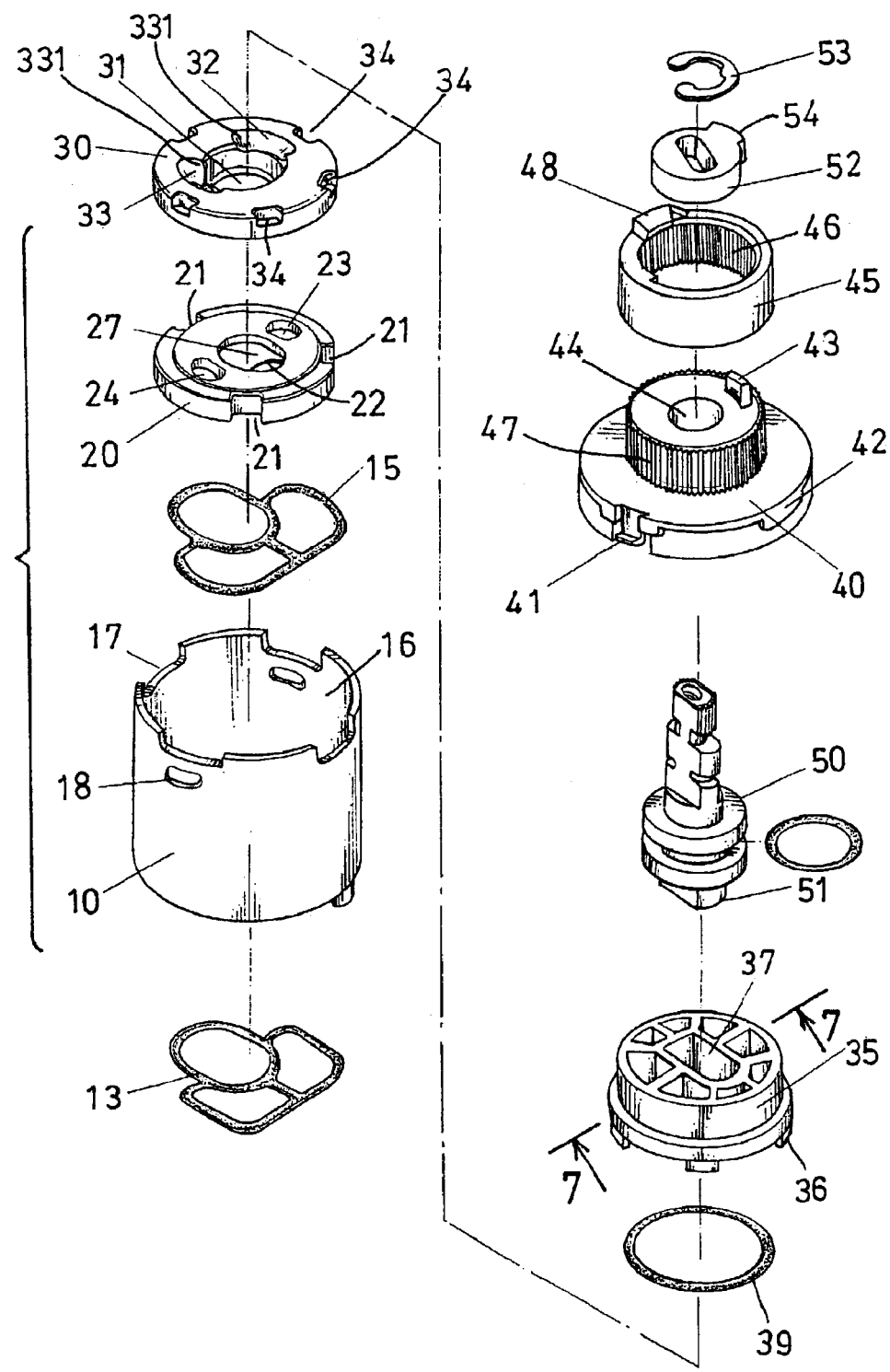
FIG. 1 is an exploded view of a valve in accordance with the present invention.
Figure 2:
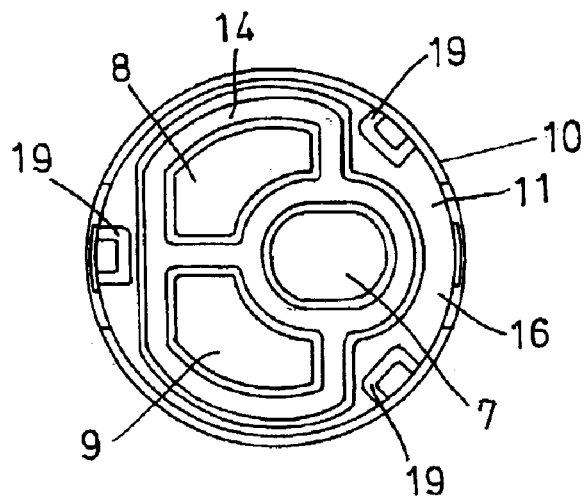
FIG. 2 is a top plan view of a housing of the valve.
Figure 3:
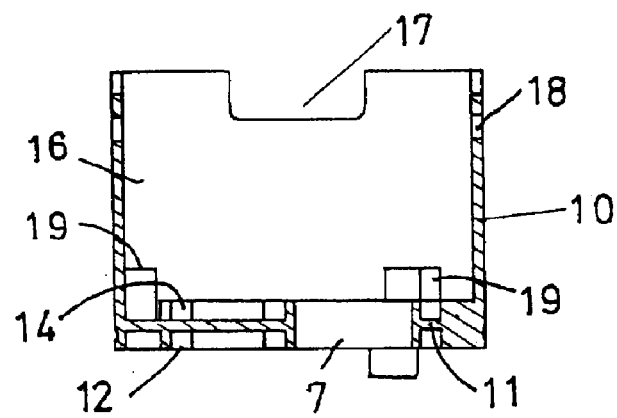
FIG. 3 is a cross sectional view taken along lines 3—3 of FIG. 2.
Figure 4:
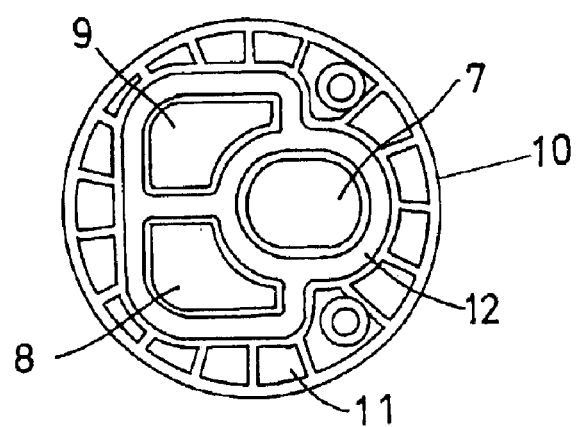
FIG. 4 is a bottom plan view of the housing of the valve.
Figure 5:
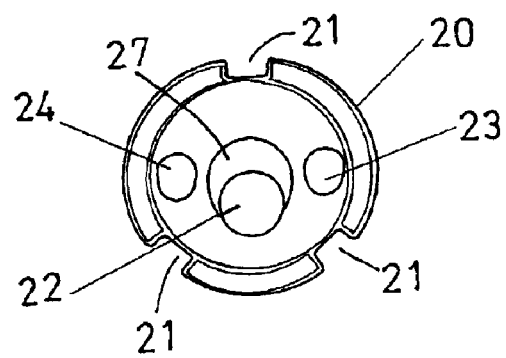
FIG. 5 is a top plan view of a seat of the valve.
Figure 6:
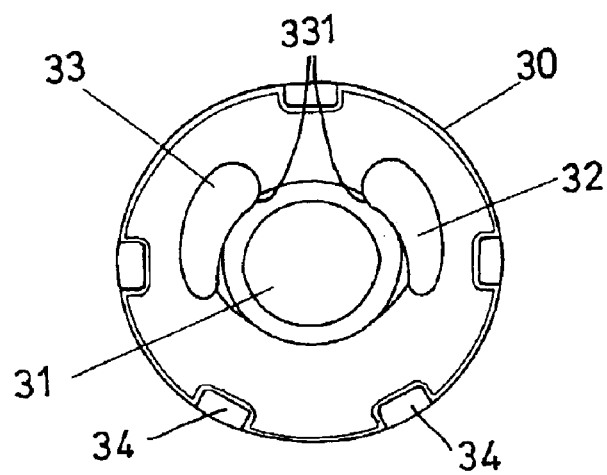
FIG. 6 is a top plan view of a rotary member of the valve.
Figure 7:
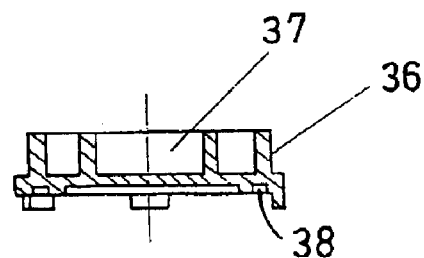
FIG. 7 is a cross sectional view taken along lines 7—7 of FIG. 1.

Referring to the drawings, and initially to FIGS. 1–7, a valve in accordance with the present invention comprises a housing 10 including a depression 12 formed in the bottom panel 11 thereof (FIG. 4) for receiving a sealing ring 13 (FIG. 1) therein, and another depression 14 formed in the inner or upper portion of the bottom panel 11 (FIG. 2) for receiving another sealing ring 15 (FIG. 1) therein, and including a chamber 16 formed therein.

The housing 10 further includes one or more notches 17 and one or more orifices 18 formed in the upper portion thereof (FIGS. 1, 3), and includes one or more projections 19 extended into the chamber 16 thereof, and preferably located close to or extended from the bottom panel 11 thereof. The housing 10 includes a cold water inlet 8 and a hot water inlet 9 formed therein (FIGS. 2–4) to receive cold water and hot water respectively, and includes a water outlet 7 for allowing the water to flow out of the housing 10.

A seat 20 is received in the chamber 16 of the housing 10, and engaged onto the sealing ring 15 and/or the bottom panel 11, and includes one or more openings 21 formed in the outer peripheral portion thereof, to receive the projections 19 of the housing 10, and in order to position the seat 20 in the chamber 16 of the housing 10, and so as to prevent the seat 20 from being rotated relative to the housing 10.

The seat 20 is preferably made of porcelain materials, and includes two ports 23, 24 (FIGS. 1, 5) formed therein and aligned with and communicating with the cold water inlet 8 and the hot water inlet 9 of the housing 10 respectively, and includes an aperture 22 formed therein and aligned with and communicating with the water outlet 7 of the housing 10, for allowing the cold water and the hot water to be mixed or blended within the housing 10, and to flow out through the aperture 22 of the seat 20 and the water outlet 7 of the housing 10.

A rotary member 30 is rotatably received in the chamber 16 of the housing 10, and engaged onto the seat 20, and includes a bore 31 (FIGS. 1, 6) formed therein and aligned with and communicating with the aperture 22 of the seat 20 and the water outlet 7 of the housing 10, for allowing the mixed or blended water in the housing 10 to flow out through the bore 31 of the rotary member 30, the aperture 22 of the seat 20 and the water outlet 7 of the housing 10.

The rotary member 30 includes two slots 32, 33, such as two curved slots 32, 33 formed therein, and provided around the bore 31 of the rotary member 30, for selectively communicating with the cold water inlet 8 and the hot water inlet 9 of the housing 10 and thus the ports 23, 24 of the seat 20 respectively when the rotary member 30 is rotated relative to the housing 10 and the seat 20, as best shown in FIGS. 8–15.

The rotary member 30 is also preferably made of porcelain materials, and engaged onto the seat 20 that is also made of porcelain materials, such that a water tight seal may be suitably formed between the rotary member 30 and the seat 20 that are both made of porcelain materials. The rotary member 30 further includes one or more recesses 34 formed therein, such as formed in the outer peripheral portion thereof.

The seat 20 includes a space 27 formed in the upper portion thereof and communicating with the aperture 22 thereof. The curved slots 32, 33 of the rotary member 30 has a portion 331 communicated with the bore 31 thereof, and thus for communicating with the space 27 of the seat 20, for allowing the water from the ports 23, 24 of the seat 20 and the slots 32, 33 of the rotary member 30 to be mixed or blended within the bore 31 of the rotary member 30, and to flow out through the aperture 22 of the seat 20.

A follower 35 is further provided and rotatably received in the chamber 16 of the housing 10, and includes one or more juts 36 extended therefrom and engaged into the recesses 34 of the rotary member 30, for allowing the follower 35 to be rotated in concert with the rotary member 30, and for allowing the rotary member 30 to be rotated relative to the housing 10 and the seat 20 by the follower 35.

The follower 35 includes a cavity 37 (FIGS. 1, 7) formed in the upper portion thereof, and includes a peripheral recess 38 (FIG. 8) formed in the bottom portion thereof to receive a sealing ring 39. The sealing ring 39 is engaged onto the rotary member 30, for making a water tight seal with the rotary member 30, and thus for preventing the water in the bore 31 of the rotary member 30 to flow beyond the follower 35.

A cover 40 is engaged onto the upper portion of the housing 10, and includes one or more latches 41 provided thereon and engaged into the orifices 18 of the housing 10, for locking or securing the cover 40 onto the upper portion of the housing 10. The cover 40 further includes one or more bulges 42 extended from the outer peripheral portion thereof and engaged into the notches 17 of the housing 10, for preventing the cover 40 from being rotated relative to the housing 10. The cover 40 may be used to retain the seat 20 and the rotary member 30 and the follower 35 within the housing 10.

The cover 40 includes one or more protrusions 43 extended upwardly therefrom, and includes a bore 44 formed therein. A ring 45 is engaged onto the upper and outer portion of the cover 40, and includes a number of teeth 46 formed in the inner peripheral portion thereof to engage onto or with the corresponding teeth 47 of the cover 40, and to prevent the ring 45 from rotating relative to the cover 40. The ring 45 includes one or more protrusions 48 extended upwardly therefrom.

A stem 50 includes a lower portion rotatably received in the chamber 16 of the housing 10, and includes a swelling 51 provided on the bottom portion thereof, and engaged into the cavity 37 of the follower 35, for allowing the follower 35 and thus the rotary member 30 to be rotated relative to the housing 10 and the seat 20 by the stem 50. A stop 52 is secured onto the stem 50 with a clamping ring 53.

The stop 52 includes an extension 54 extended therefrom, for engaging with either the protrusions 43 of the cover 40 or the protrusions 48 of the ring 45, in order to limit the rotational movement of the stem 50 and thus the follower 35 and the rotary member 30 relative to the housing 10 and the seat 20. The configuration of the cover 40 and the ring 45 and the stop 52 is typical and will not be described in further details.

Figure 8:
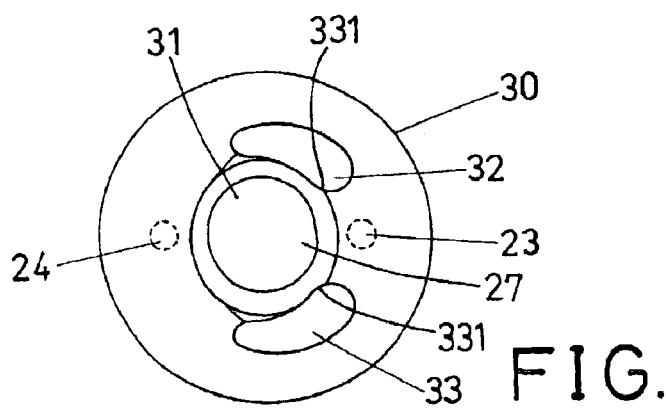
FIGS. 8, 9, 10, 11, 12, 13, 14, 15 are partial top plan schematic views illustrating the operation of the valve.

In operation, as shown in FIG. 8, when the slots 32, 33 of the rotary member 30 are offset from the ports 23, 24 of the seat 20, the ports 23, 24 of the seat 20 will be blocked or enclosed by the rotary member 30, such that both the cold water and the hot water may not flow into the bore 31 of the rotary member 30 via the ports 23, 24 of the seat 20.

Figure 9:
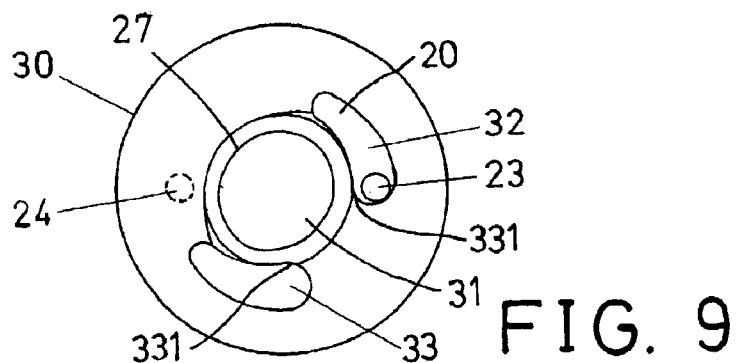

As shown in FIG. 9, when the rotary member 30 is rotated clockwise relative to the seat 20, until the curved slot 32 of the rotary member 30 is aligned with or communicating with the port 23 of the seat 20, the cold water may flow through the port 23 of the seat 20 and may flow into the curved slot 32 of the rotary member 30, and then may flow out through the bore 31 of the rotary member 30 and the aperture 22 of the seat 20. At this moment, the port 24 of the seat 20 is still blocked or enclosed by the rotary member 30, such that the hot water may not flow into the bore 31 of the rotary member 30.

Figure 10:
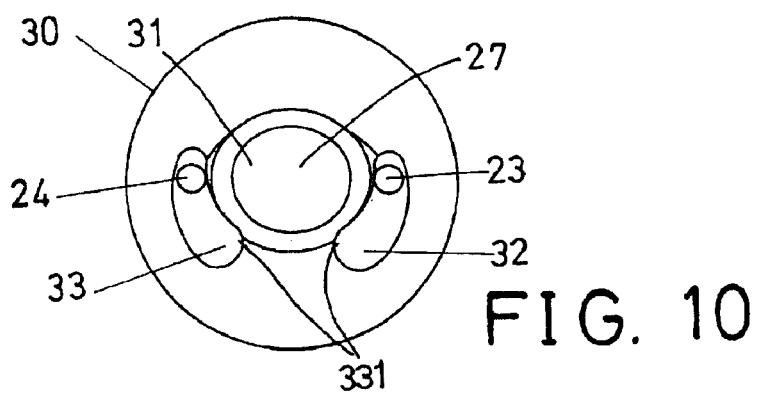

As shown in FIG. 10, when the rotary member 30 is further rotated clockwise relative to the seat 20, until both the curved slots 32, 33 of the rotary member 30 are aligned with or communicating with the ports 23, 24 of the seat 20, both the cold and the hot water may flow through the ports 23, 24 of the seat 20 and may flow into the curved slots 32, 33 of the rotary member 30, and then may flow into and may be mixed within the bore 31 of the rotary member 30 and the aperture 22 of the seat 20, and then may flow out through the aperture 22 of the seat 20.

Figure 11:
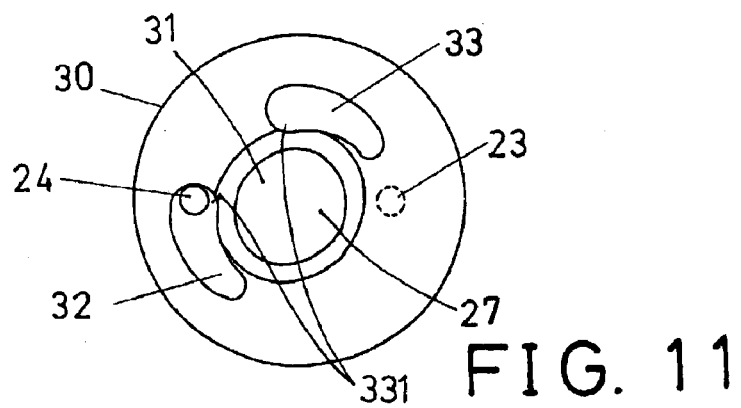

As shown in FIG. 11, when only the curved slot 32 of the rotary member 30 is aligned with or communicating with the port 24 of the seat 20, the hot water may flow through the port 24 of the seat 20 and may flow into the curved slot 32 of the rotary member 30, and then may flow out through the bore 31 of the rotary member 30 and the aperture 22 of the seat 20. At this moment, the port 23 of the seat 20 may be blocked or enclosed by the rotary member 30, such that the cold water may not flow into the bore 31 of the rotary member 30.

Figure 12:
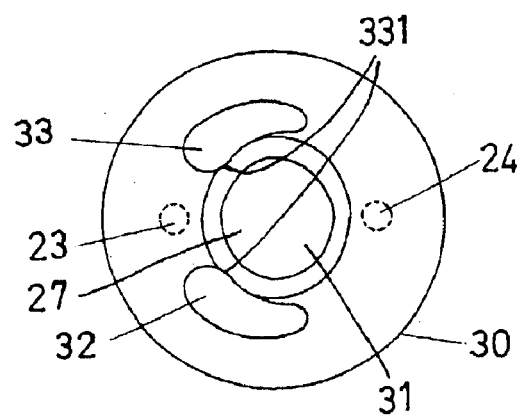

As shown in FIGS. 12–15, when the cold and the hot waters have been wrongly supplied to the ports 23, 24 of the seat 20 that are disposed different from that shown in FIGS. 8–11, the rotary member 30 may be disposed in different orientation opposite to that shown in FIGS. 8–11. Both the ports 23, 24 of the seat 20 may be blocked or enclosed by the rotary member 30, as shown in FIG. 12, such that both the cold water and the hot water may not flow into the bore 31 of the rotary member 30 via the ports 23, 24 of the seat 20.

Figure 13:
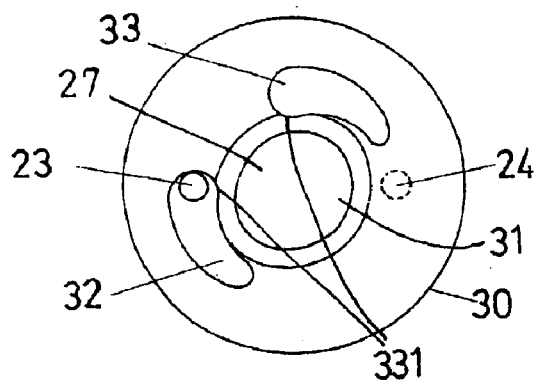

As shown in FIG. 13, when the rotary member 30 is rotated clockwise relative to the seat 20, until the curved slot 32 of the rotary member 30 is aligned with or communicating with the port 23 of the seat 20, the cold water may flow through the port 23 of the seat 20 and may flow into the curved slot 32 of the rotary member 30, and then may flow out through the bore 31 of the rotary member 30 and the aperture 22 of the seat 20. At this moment, the port 24 of the seat 20 is still blocked or enclosed by the rotary member 30, such that the hot water may not flow into the bore 31 of the rotary member 30.

Figure 14:
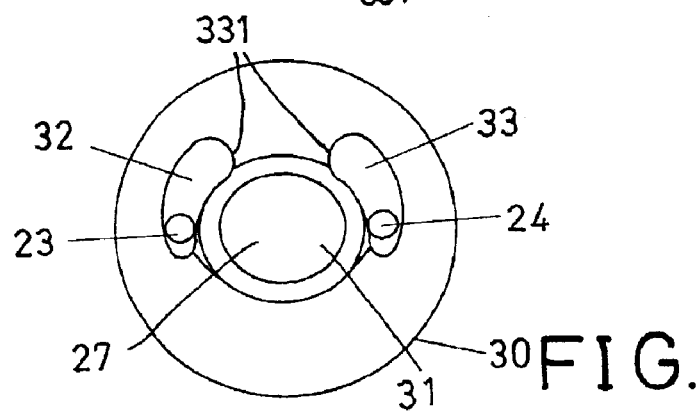

As shown in FIG. 14, when the rotary member 30 is further rotated clockwise relative to the seat 20, until both the curved slots 32, 33 of the rotary member 30 are aligned with or communicating with the ports 23, 24 of the seat 20, both the cold and the hot water may flow through the ports 23, 24 of the seat 20 and may flow into the curved slots 32, 33 of the rotary member 30, and then may flow into and may be mixed within the bore 31 of the rotary member 30 and the aperture 22 of the seat 20, and then may flow out through the aperture 22 of the seat 20.

Figure 15:
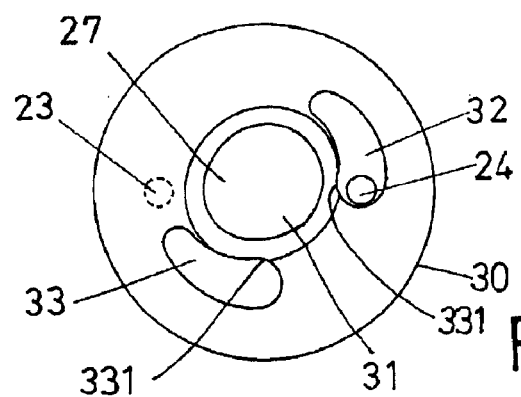

As shown in FIG. 15, when only the curved slot 32 of the rotary member 30 is aligned with or communicating with the port 24 of the seat 20, the hot water may flow through the port 24 of the seat 20 and may flow into the curved slot 32 of the rotary member 30, and then may flow out through the bore 31 of the rotary member 30 and the aperture 22 of the seat 20. At this moment, the port 23 of the seat 20 may be blocked or enclosed by the rotary member 30, such that the cold water may not flow into the bore 31 of the rotary member 30.

The rotary movement of the rotary member 30 relative to the seat 20 may thus be used to effectively control the flow of the cold water or the hot water, or the mixing or blending of both the cold water and the hot water, without coil spring members. The rotary member 30 and the seat 20 of porcelain materials may be used to make a water tight seal therebetween.

Accordingly, the valve in accordance with the present invention includes the rotary member and the seat both made of porcelain materials for solidly and effectively making water tight seals without coil spring members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. The valve for mixing cold and hot water, comprising:
   a housing including a depression formed in the bottom panel thereof for receiving a sealing ring therein, and another depression formed in the bottom panel for receiving another sealing ring therein, and including a chamber formed therein;
   a housing including at least one notch and at least one orifice formed in the upper portion thereof, the bottom panel being at a bottom end of the housing; and including at least one projection extended into the chamber thereof and close to or extended from the bottom panel thereof; the housing including a cold water inlet and a hot water inlet formed therein to receive cold water and hot water respectively, and including a water outlet for allowing the water to flow out of the housing;
   a seat received in the chamber of the housing, and engaged onto the sealing ring and/or the bottom panel, and including at least one openings formed in an outer peripheral portion thereof so as to receive the projections of the housing, and to position the seat in the chamber of the housing, so as to prevent the seat from being rotated relative to the housing;
   a rotary member rotatably received in the chamber of the housing, and engaged onto the seat, and including a bore formed therein and aligned with and communicating with the aperture of the seat and the water outlet of the housing, for allowing the mixed water in the housing to flow out through the bore of the rotary member, the aperture of the seat and the water outlet of the housing;
   a follower provided and rotatably received in the chamber of the housing, and including at least one jut extended therefrom and engaged into the recesses of the rotary member, for allowing the follower to be rotated in concert with the rotary member, and for allowing the rotary member to be rotated relative to the housing and the seat by the follower;
   a cover engaged onto the upper portion of the housing, and including at least one latches provided thereon and engaged into the orifices of the housing, for securing the cover onto the upper portion of the housing; the cover including at least one bulges extended from the outer peripheral portion thereof and engaged into the notches of the housing for preventing the cover from being rotated relative to the housing; the cover serving to retain the seat and the rotary member and the follower within the housing; and
   a stem including a lower portion rotatably received in the chamber of the housing, and including a swelling provided on the bottom portion thereof, and engaged into the cavity of the follower for allowing the follower and thus the rotary member to be rotated relative to the housing and the seat by the stem 50; and a stop being secured onto the stem with a clamping ring.

2. The valve for mixing cold and hot water as claimed in claim 1, wherein the seat is made of porcelain materials, and includes two holes formed therein and aligned with and communicating with the cold water inlet and the hot water inlet of the housing respectively, and including an aperture formed therein and aligned with and communicating with the water outlet of the housing for allowing the cold water and the hot water to be mixed within the housing, and to flow out through the aperture of the seat and the water outlet of the housing.

3. The valve for mixing cold and hot water as claimed in claim 2, wherein
   the rotary member includes two curved slots, and provided around the bore of the rotary member for selectively communicating with the cold water inlet and the hot water inlet of the housing and thus the holes of the seat respectively when the rotary member is rotated relative to the housing and the seat;

the rotary member is also preferably made of porcelain materials, and engaged onto the seat that is also made of porcelain materials, such that a water tight seal is suitably formed between the rotary member and the seat that are both made of porcelain materials; the rotary member further includes one or more recesses formed therein; and the seat including a space formed in the upper portion thereof and communicating with the aperture thereof; the curved slots of the rotary member having a portion communicated with the bore thereof, and thus for communicating with the space of the seat, for allowing the water from the holes of the seat and the slots of the rotary member to be mixed within the bore of the rotary member, and to flow out through the aperture of the seat.

4. The valve for mixing cold and hot water as claimed in claim 3, wherein the follower includes a cavity formed in the upper portion thereof, and includes a peripheral recess formed in the bottom portion thereof to receive a sealing ring; the sealing ring is engaged onto the rotary member, for making a water tight seal with the rotary member, and thus for preventing the water in the bore of the rotary member to flow beyond the follower.

5. The valve for mixing cold and hot water as claimed in claim 4, wherein the cover includes at least one protrusion extended upwardly therefrom, and includes a bore formed therein; a ring is engaged onto the upper and outer portion of the cover, and includes a number of teeth formed in the inner peripheral portion thereof to engage onto or with the corresponding teeth of the cover; the ring includes one or more protrusions extended upwardly therefrom.

6. The valve for mixing cold and hot water as claimed in claim 5, wherein the stop includes an extension extended therefrom for engaging with either the protrusions of the cover or the protrusions of the ring.

* * * * *